United States Patent
Venkatachalam et al.

(10) Patent No.: US 8,219,086 B2
(45) Date of Patent: Jul. 10, 2012

(54) LOW DUTY MODE FOR FEMTOCELL BASE STATIONS

(75) Inventors: Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 12/646,337

(22) Filed: Dec. 23, 2009

(65) Prior Publication Data

US 2011/0003591 A1    Jan. 6, 2011

Related U.S. Application Data

(60) Provisional application No. 61/223,360, filed on Jul. 6, 2009.

(51) Int. Cl.
*H04W 4/00* (2009.01)

(52) U.S. Cl. .................. 455/434; 455/552.1; 455/553.1; 370/328; 370/338; 370/331

(58) Field of Classification Search .......... 455/436–448, 455/434, 435.1–435.3, 552.1, 553.1; 370/328, 370/352, 335, 241, 331, 336, 338, 343, 350
See application file for complete search history.

(56) References Cited

U.S. PATENT DOCUMENTS

| | | | |
|---|---|---|---|
| 2009/0052395 A1 | 2/2009 | Bao et al. | |
| 2009/0168726 A1* | 7/2009 | Thalanany et al. | 370/332 |
| 2009/0280819 A1* | 11/2009 | Brisebois et al. | 455/446 |

FOREIGN PATENT DOCUMENTS

| | | |
|---|---|---|
| KR | 1020090045183 | 5/2009 |
| KR | 1020090049389 | 5/2009 |
| WO | WO-2011005662 A2 | 1/2011 |

OTHER PUBLICATIONS

"International Application Serial No. PCT/US2010/040817, Search Report mailed Jan. 28, 2011", 3 pgs.
"International Application Serial No. PCT/US2010/040817, Written Opinion mailed Jan. 28, 2011", 4 pgs.

* cited by examiner

*Primary Examiner* — Wayne Cai
(74) *Attorney, Agent, or Firm* — Schwegman, Lundberg & Woessner, P.A.

(57) ABSTRACT

A low duty mode is provided for a femtocell base station operating as part of a cellular communications system. Methods and systems are described for reducing the service impact of the low-duty mode on mobile stations that are either already attached or are attempting to attach to a femtocell base station.

20 Claims, 2 Drawing Sheets

LOW DUTY MODE FOR FEMTOCELL BASE STATIONS

This application claims the benefit of priority to U.S. Provisional Patent Application Ser. No. 61/223,360, filed on Jul. 6, 2009, which is incorporated herein by reference in its entirety.

BACKGROUND

Cellular wireless communications systems such as those defined by the IEEE 802.16 standard (IEEE std. 802.16-2004, approved Jun. 24, 2004) provide communications for mobile systems (MS) (e.g., phones, computers, or other portable devices) over a service provider's core network or backbone by means of base stations (BS) connected to the core network that relay communications to and from the MS via a wireless link. The geographic area over which a particular BS is able to communicate wirelessly (i.e., the air interface) is referred to as a cell. An MS enters the network by attaching to a specific BS with which it is in range, and the attachment may move to other BS's when conditions warrant (e.g., a change of location as the MS moves from one cell to another) with a handover process.

A BS may provide uplink channels and downlink channels for multiple MS's that are attached to it by both time division and frequency division multiplexing. The BS periodically broadcasts a superframe header (SFH) that divides time into discrete segments called superframes that contain time slots used for data transmission between the BS and an MS. A superframe is divided into various other frames and subframes down to the basic symbols that are encoded according to a particular data modulation scheme such as OFDM. The SFH and other frame preambles contain control information that allocates bandwidth resources among multiple MS's by assigning particular time slots and frequencies to the MS's for both the uplink and downlink channels. Control information in the form of pilot or training signals is also provided to enable the timing synchronization necessary for symbol detection and, in the case OFDM or OFDMA, for maintaining orthogonality between the sub-carriers.

In order for an MS to attach to a BS, it scans over a number of different frequency channels until it receives an SFH. The MS then synchronizes with the received signal and contends for medium access within a time slot defined for that purpose following an SFH in order to register with the BS. After registration, the MS may enter a power saving sleep mode and operate with a pattern of available intervals and unavailable intervals. The BS provides resource allocation, i.e., defined time slots and frequencies for the MS's uplink and downlink channels. during available intervals. If the MS has no traffic, the MS may de-register from the BS and further enter an idle mode, with a periodic pattern of paging available intervals and paging unavailable intervals. If there is incoming new traffic for the MS in idle mode, the BS pages the idle mode MS during its paging available intervals.

One type of BS, usually operated by the cellular service provider for servicing a relatively large area and many MS's, is referred to as a macro BS, and the area served by the macro BS is referred to as a macro cell. Another class of BS is a femtocell BS having a coverage area or femtocell that is usually very much smaller than a macro cell. A femtocell BS is a low-power BS that is typically installed by a subscriber in the home or elsewhere in order to lower costs and extend service coverage. A femtocell BS usually employs a broadband connection such as fiber optic, cable, or DSL for a backhaul link. A femtocell BS may be public or restricted to only selected subscribers, referred to as a closed subscriber group (CSG).

A femtocell BS may use the same or different frequencies as a macro BS. When a femtocell is at least partially overlapped by a macro cell, the latter is referred to as an overlay macro cell. A femtocell BS listens to overlay macro BS transmissions and employs timing synchronization as well as TDM and FDM for its transmissions to reduce interference with its neighboring macro BS's. For practical reasons, however, some amount of interference with overlay macro BS's may still result. In order to further reduce such interference, as well as conserve power, a femtocell BS may be configured to operate in either a normal operating mode or a low-duty mode (LDM). In the normal operating mode, the femtocell BS operates as described above by periodically broadcasting control information as well as managing scheduled downlink and uplink traffic to and from the MS's that are attached to it. In the low-duty mode, the femtocell BS alternates unavailable and available intervals according to a pre-defined pattern. During an available interval, the femtocell BS is active on the air interface via its wireless subsystem as described for the normal operating mode so it can continue to page the MS's that are attached to it to determine if they are still present in its cell. During an unavailable interval, the femtocell BS ceases all transmitting activity but may continue to listen for transmissions for purposes of synchronization and interference detection. Because no control information is transmitted by the femtocell BS during an unavailable interval, an MS is unable to communicate with it until an available interval occurs.

A femtocell BS may be configured to enter the low-duty mode only if no MS's are currently attached to it or if all attached MS's are either in sleep mode or idle mode. Described herein are methods and systems for reducing the service impact of the low-duty mode on MS's either already attached or are attempting to attach to a femtocell BS.

DETAILED DESCRIPTION

Figure 1:
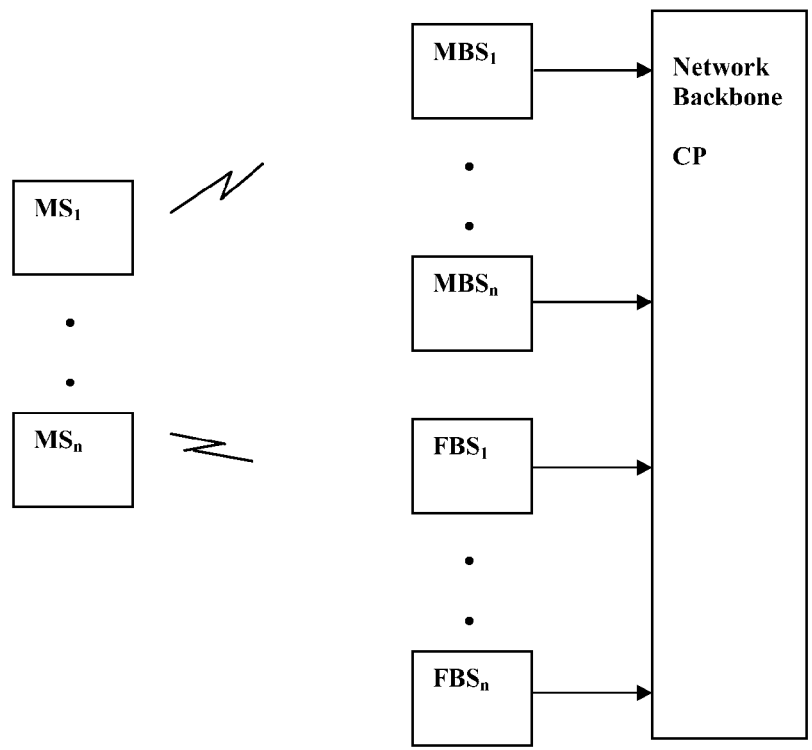
FIG. 1 shows a cellular wireless communications system.

FIG. 1 illustrates the basic components of a cellular wireless communications system that includes femtocells and macro cells. A plurality of macro cell base stations $MBS_1$ through $MBS_n$ and femtocell base stations $FBS_1$ through $FBS_n$ are shown, where each base station is located to cover a specific geographic area or cell. A plurality of mobile stations $MS_1$ through $MS_n$ are shown that communicate wirelessly with one or more of the base stations. The base stations interface via a backhaul link to the core portion CP (backbone) of the service provider's network over which they may relay traffic as well as communicate with one another.

Figure 2:
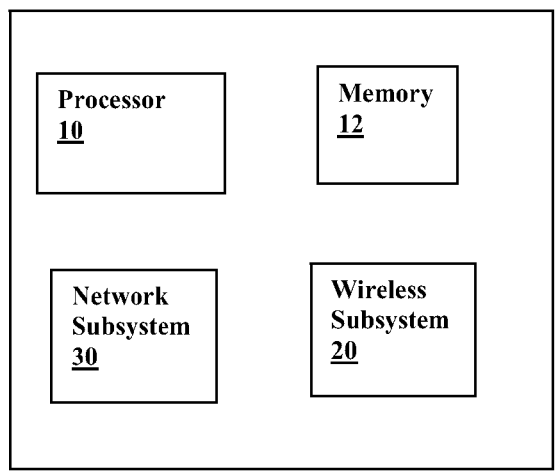
FIG. 2 illustrates the subsystem components of exemplary wireless devices.

FIG. 2 shows the subsystem components of an exemplary base station. A processing device 10 coupled to an associated memory 12 controls the operation of a wireless subsystem 20 for providing the air interface and a network subsystem 30 for interfacing to the backhaul link. An exemplary mobile station would be represented similarly minus the network subsystem.

The processing device and memory may be implemented as a microprocessor-based controller with memory for data and program storage, implemented with dedicated hardware components such as ASICs (e.g., finite state machines), or implemented as a combination thereof. As the terms are used herein, a description that a particular device such as an MS or BS is to perform various functions or is configured to perform various functions refers to either code executed by a microprocessor or to specific configurations of hardware components for performing particular functions. Such code may also be contained in a suitable storage medium from which they may be transferred to a memory or other processor-executable medium.

As described above, besides the normal operation mode, femtocell BS's may support a low-duty operation mode in order to reduce interference to neighboring cells and conserve power. The low-duty operation mode consists of available intervals and unavailable intervals. During an available interval, a femtocell BS transmits the SFH, preambles, and other downlink control signals in the frame and also becomes active on the air interface for synchronization and signaling purposes such as paging, ranging or for data traffic transmission opportunities for the MS's. During an unavailable interval, the femtocell BS does not transmit anything on the air interface, including preambles and SFH, but may still use the air interface for other purposes such as synchronization with overlay macro BS's, detecting the preferred MS's, measuring the interference from neighbor cells, etc. It is desirable to ensure that the MS's that are attached to (or trying to attach to) a femtocell BS are minimally impacted in terms of their service by the unavailability intervals of the femtocell BS when operating in the low-duty mode. Solutions for this problem are described below.

In a first type of solution, it is assumed that no patterns for the femtocell LDM have been specified that are normally made available to the MS. In one embodiment, in order to do ensure that there is no service impact to MS's that are attached to the femtocell BS, the femtocell BS is configured to ensure that its unavailable intervals during the LDM are always a subset of the sleep intervals of the attached MS's and/or the paging unavailable intervals of the idle mode MS's with idle mode entry at the femtocell BS. This way, the attached MS's are in sleep mode trying to save their battery power only during the unavailable intervals of the femtocell BS low-duty mode. In the event that due to traffic dynamics a particular MS may need more available time than its current sleep pattern, the femtocell BS may continue to serve the MS, which means the femtocell BS may still be ON from time to time within its regular unavailable interval, until the related procedure (e.g. ranging, HARQ retransmissions etc) finishes. That is, the femtocell BS may be configured to be able to adjust the unavailable intervals of the LDM to be a subset of the sleep unavailable intervals of the MS when the MS unavailable interval pattern changes such as due to traffic dynamics or operation mode switch. This simply ensures the LDM is transparent to the MS and does not require LDM related change to MS behavior.

Other embodiments for the first type of solution concern situations where MS's are trying to attach to the femtocell BS. In one situation, an MS is trying to do initial network entry, or network re-entry from idle mode, into a femtocell BS operating in the LDM. In this case, the MS doing network (re) entry into the femtocell BS may miss the femtocell BS due to the fact that the femtocell BS is in an unavailable interval during the time that the MS is scanning for it. In such a case, the MS will likely attach to an overlay macro BS. The overlay macro BS can then eventually prepare a network initiated handover for this MS to attach to the femtocell BS as discussed below. Alternatively, when the MS is ranging with the overlay macro BS, the macro BS can indicate the preamble of the femtocell BS in the "preamble index override" field of the RNG-RSP message itself, and also optionally wake up the femtocell BS from LDM into regular operation mode via the network backbone. This will trigger the MS to go scan for the femtocell BS once again. If the MS scans for a while, the femtocell BS will likely have come out of the unavailable mode, at which point the MS can then attach to the femtocell BS. In another situation, an MS is trying to do a prepared handover to femtocell BS from a macro BS. In this case, the macro BS is configured to contact the femtocell BS during handover preparation over the backhaul. The femtocell BS can then be in an available normal operating mode during the scanning and handover process. For example, the macro wakes up the femtocell BS (i.e., causes it to exit the LDM) over the backhaul when the MS sends a scan-REQ or HO-REQ to the macro BS or when the macro BS initiates MS scanning or handover via an unsolicited scan-RSP or HO-RSP (handover command). Another situation is where an MS is trying to do uncontrolled handover to a femtocell BS from a macro BS. This is equivalent to the situation discussed above where the MS is attempting to attach to a femtocell BS and may be handled similarly.

A second type of solution involves specifying one or more default LDM patterns for the femto LDM. The whole system of deployed femtocell BS's could then be made to synchronize around one or more default LDM patterns. The default LDM pattern(s) may consist of periodic and alternating awake (ON) and unavailable (OFF) periods for the Femtocell BS, which are of predefined values. In other words all the femtocell BS's of a particular area service network (ASN) should be mandatorily awake during the ON time of the default LDM pattern. They can, of course, be ON even beyond the minimum required ON time of the pattern. They can be OFF, however, for no longer than the OFF time as dictated by the default LDM pattern. This is similar to the adapting of LDM operation to traffic dynamics discussed above, which gives more flexibility to femtocell BS operation with only the constraint of the default LDM pattern.

Figure 3:
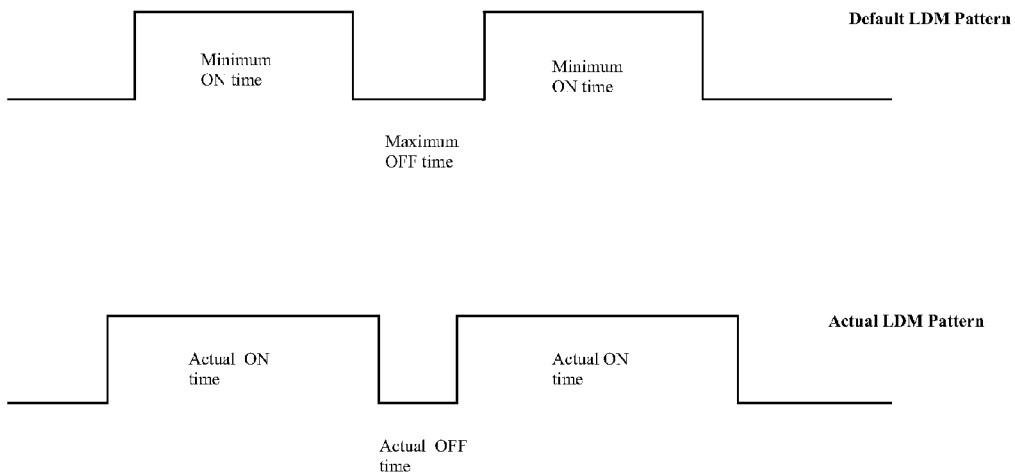
FIG. 3 illustrates an exemplary default LDM pattern compared with an actual LDM pattern.

In one embodiment, all the femtocell BS's in the ASN are configured to follow a particular default LDM pattern. An example of a default LDM pattern is shown in FIG. 3 which illustrates an exemplary default LDM pattern compared with an actual LDM pattern. The MS can be made aware of the default LDM pattern(s) by a number of means. One way is for the default LDM pattern(s) to be broadcast on the airlink by all the BS's in the ASN including femtocell BS's and macro cell BS's. The MS's can then receive this LDM pattern broadcast. Another way is for the default LDM pattern(s) to be pre-provisioned in the MS during initial provisioning or during initial network entry. The advantage of the LDM patterns being known to the MS is that the MS can use it for efficient scanning of femtocells during initial network entry and network-re-entry and during uncontrolled handover. The MS knows exactly when the femtocell BS's will be available for scanning and will try to scan for its preferred femtocells during the ON time of the default LDM pattern(s) supported.

Figure 4:
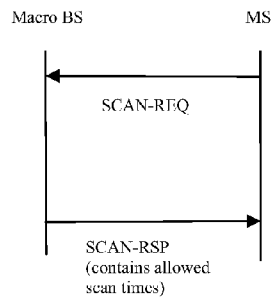
FIG. 4 illustrates an exemplary default LDM pattern compared with an MS scanning pattern assigned by a BS.
Figure 4:
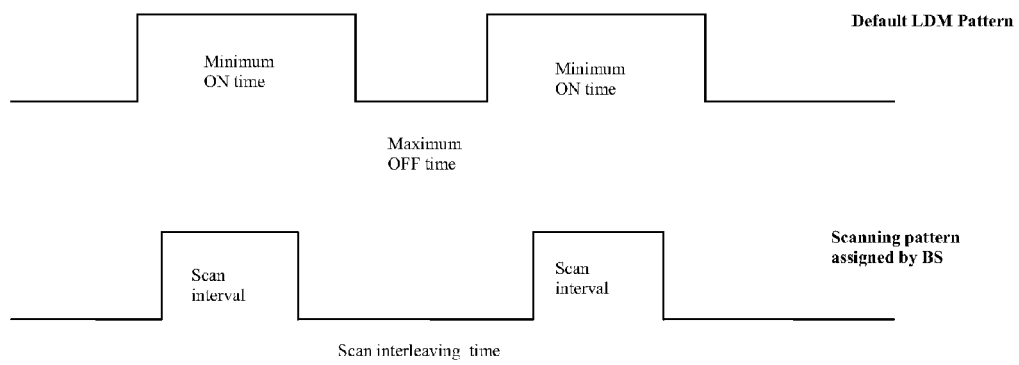

In another embodiment, the LDM pattern can be well-known only among the network entities such as femtocell BS's and macro BS's but not be known explicitly to the MS. In such a scenario, MS initial network entry/re-entry and uncontrolled handover may be made to work exactly as discussed above with respect to the first type of solution. For fully prepared handover, however, when the MS tries to scan for the target femto cell BS's, the macro BS can provide scan times in such a way that it aligns with the LDM patterns of the target femtocell BS. That is, the scanning start times and scanning intervals may be made to fall in the available ON intervals of femtocell BS. In this way, the whole LDM patterns, even if they exist, can be made completely transparent to the MS behavior. An example of this type of LDM pattern is FIG. 4 which illustrates an exemplary default LDM pattern compared with an MS scanning pattern assigned by a BS.

In exemplary embodiments, a cellular communications system configured to implement the solutions described above includes: 1) at least one of each of a femtocell base station (BS) and an overlay macro BS, each of which includes a processing coupled to a memory, a wireless subsystem, and a network subsystem for communicating over a backhaul link to a core portion of a service provider's network, 2) at least one mobile station (MS) that includes a processing device coupled to a memory and a wireless subsystem, wherein the MS is configured to be able to access one or more femtocell or macro BS's in order to communicate over the cellular network. The femtocell BS is configured to operate in a low-duty mode (LDM) that includes alternating available and unavailable intervals for its wireless subsystem.

In one embodiment, the macro BS is configured to, if the MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead, transmit a message that triggers the MS to repeat scanning for the femtocell BS. The macro BS may be configured to transmit the message that triggers the MS to repeat its scanning for the femtocell BS(s) associated with particular preamble(s), during a ranging operation between the MS and macro BS. The macro BS may be further configured to, if the MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead, transmit a message over the backhaul link to the femtocell BS that causes the femtocell BS to cease operating in the LDM and resume normal transmission for its wireless subsystem. The MS may also be configured to operate with defined sleep intervals and defined paging unavailable intervals with the femtocell BS further configured such that the unavailable intervals of the LDM are a subset of the sleep and paging unavailable intervals of the MS.

In another embodiment, the macro BS is configured to transmit a message over the backhaul link to the femtocell BS during handover preparation that causes the femtocell BS to cease operating in the LDM when the MS sends a scan request or handover request to the macro BS or when the macro BS initiates scanning by the MS via an unsolicited scanning or handover command. The MS may be configured to operate with defined sleep intervals and defined paging unavailable intervals with the femtocell BS further configured such that the unavailable intervals of the LDM are a subset of the sleep and paging unavailable intervals of the MS.

In another embodiment, each femtocell BS is configured to operate in a low-duty mode (LDM) that includes alternating available and unavailable intervals for its wireless subsystem and wherein the unavailable intervals of each femtocell BS are synchronously constrained to be a subset of a predefined default LDM pattern. The macro BS and each MS are then configured with a stored representation of the femtocell BS's default LDM pattern with the MS further configured to align its scan times within available intervals of the femtocell BS's according to the default LDM pattern when scanning for a femtocell BS. The MS may be configured with the stored representation of the femtocell BS default LDM pattern during initial provisioning, over-the-air provisioning, or during initial network entry. Alternatively, the MS may be configured with the stored representation of the femtocell BS default LDM pattern by receiving a broadcast from a femtocell BS or a macro BS. In another alternative, the MS may configured with the stored representation of the femtocell BS default LDM pattern by receiving a message containing the default LDM pattern from the macro BS along with a message to repeat scanning if the MS is unsuccessful in attaching to the femtocell BS during network entry/re-entry or an uncontrolled handover due to the femtocell BS being in an unavailable interval while the MS is scanning for the femtocell BS and attaches to the macro BS instead. In yet another alternative, the MS is configured with the stored representation of the femtocell BS default LDM pattern by receiving a message containing the default LDM pattern from the macro BS during handover preparation when the MS sends a scan request or handover request to the macro BS or when the macro BS initiates scanning or handover by the MS via an unsolicited scanning or handover command.

It should be appreciated that the various embodiments described above may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A cellular communications system, comprising:
at least one of each of a femtocell base station (BS) and an overlay macro BS, each of which includes a processing coupled to a memory, a wireless subsystem, and a network subsystem for communicating over a backhaul link to a core portion of a service provider's network;
at least one mobile station (MS) that includes a processing device coupled to a memory and a wireless subsystem, wherein the MS is to access one or more femtocell or macro BS's in order to communicate over the cellular network;
wherein the femtocell BS is to operate in a low-duty mode (LDM) that includes alternating available and unavailable intervals for its wireless subsystem; and,
wherein the macro BS is to, if the MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead, transmit a message that triggers the MS to repeat scanning for the femtocell BS.

2. The cellular communications system of claim 1 wherein the macro BS is to transmit the message that triggers the MS to repeat its scanning for the femtocell BS(s) associated with particular preamble(s), during a ranging operation between the MS and macro BS.

3. The cellular communications system of claim 1 wherein the macro BS is further to, if the MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead, transmit a message over the backhaul link to the femtocell BS that causes the femtocell BS to cease operating in the LDM and resume normal transmissions for its wireless subsystem.

4. The cellular communications system of claim 1 wherein:
the MS is to operate with defined sleep intervals and defined paging unavailable intervals;
wherein the femtocell BS is configured such that the unavailable intervals of the LDM are a subset of the sleep and paging unavailable intervals of the MS;
wherein the femtocell BS is configured to be able to adjust the unavailable intervals of the LDM to be a subset of the sleep unavailable intervals of the MS when the MS unavailable interval pattern changes such as due to traffic dynamics or operation mode switch.

5. The cellular communications system of claim 1, wherein the macro BS is to transmit a message over the backhaul link to the femtocell BS during handover preparation that causes the femtocell BS to cease operating in the LDM when the MS sends a scan request or handover request to the macro BS or when the macro BS initiates scanning by the MS via an unsolicited scanning or BS-initiated handover command.

6. The cellular communications system of claim 5 wherein:
the MS is to operate with defined sleep intervals and defined paging unavailable intervals;
wherein the femtocell BS is configured such that the unavailable intervals of the LDM are a subset of the sleep and paging unavailable intervals of the MS; and
wherein the femtocell BS is configured to be able to adjust the unavailable intervals of the LDM to be a subset of the sleep unavailable intervals of the MS when the MS unavailable interval pattern changes such as due to traffic dynamics or operation mode switch.

7. A cellular communications system, comprising:
a plurality of femtocell base stations (BS) and an overlay macro BS, wherein each macro BS and femtocell BS includes a processing device coupled to a memory, a wireless subsystem, and a network subsystem for communicating over a backhaul link to a core portion of a service provider's cellular network;
at least one mobile station (MS) that includes a processing device coupled to a memory and a wireless subsystem, wherein the MS is configured to be able to access one or more femtocell or macro BS's in order to communicate over the cellular network;
wherein each femtocell BS is to operate in a low-duty mode (LDM) that includes alternating available and unavailable intervals for its wireless subsystem and wherein the unavailable intervals of each femtocell BS are synchronously constrained to be a subset of a predefined default LDM pattern;
wherein the macro BS and each MS are configured with a stored representation of the femtocell BS's default LDM pattern; and,
wherein the MS is to align its scan times within available intervals of the femtocell BS's according to the default LDM pattern when scanning for a femtocell BS.

8. The cellular communications system of claim 7 wherein the MS is configured with the stored representation of the femtocell BS default LDM pattern during initial provisioning, over-the-air provisioning, or during initial network entry.

9. The cellular communications system of claim 7 wherein the MS is configured with the stored representation of the femtocell BS default LDM pattern by receiving a broadcast from a femtocell BS or a macro BS.

10. The cellular communications system of claim 7 wherein the MS is configured with the stored representation of the femtocell BS default LDM pattern by receiving a message containing the default LDM pattern from the macro BS along with a message to repeat scanning if the MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead.

11. The cellular communications system of claim 7 wherein the MS is configured with the stored representation of the femtocell BS default LDM pattern by receiving a message containing the default LDM pattern from the macro BS during handover preparation when the MS sends a scan request or handover request to the macro BS or when the macro BS initiates scanning or handover for the MS via an unsolicited scanning or handover command.

12. A method, comprising:
operating a femtocell BS in a manner that includes a low-duty mode (LDM) with alternating available and unavailable intervals for its wireless subsystem; and,
operating a macro BS such that, if an MS is unsuccessful in attaching to the femtocell BS during network entry/re-entry or an uncontrolled handover due to the femtocell BS being in an unavailable interval while the MS is scanning for the femtocell BS and attaches to the macro BS instead, the macro BS transmits a message that triggers the MS to repeat scanning for the femtocell BS.

13. The method of claim 12 further comprising operating the macro BS to transmit the message that triggers the MS to repeat its scanning for the femtocell BS(s) associated with particular preamble(s), during a ranging operation between the MS and macro BS.

14. The method of claim 12 further comprising operating the macro BS to, if an MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead, transmit a message over the backhaul link to the femtocell BS that causes the femtocell BS to cease operating in the LDM and resume normal transmission for its wireless subsystem.

15. The method of claim 12 further comprising:
operating the MS with defined sleep intervals and defined paging unavailable intervals; and
operating the femtocell BS such that the unavailable intervals of the LDM are a subset of the sleep and paging unavailable intervals of the MS.

16. The method of claim 12 further comprising:
operating a macro BS to transmit a message over a backhaul link to the femtocell BS during handover preparation that causes the femtocell BS to cease operating in the LDM when an MS sends a scan request or handover request to the macro BS or when the macro BS initiates scanning for the MS via an unsolicited scanning or handover command.

17. The method of claim 16 further comprising:
operating the MS with defined sleep intervals and defined paging unavailable intervals; and operating the femtocell BS such that the unavailable intervals of the LDM are a subset of the sleep and paging unavailable intervals of the MS.

18. A non-transitory medium containing processor-executable instructions for performing a method that comprises:

operating a macro BS such that, if an MS is unsuccessful in attaching to a femtocell BS during network entry/re-entry or an uncontrolled handover due to the femtocell BS being in an unavailable LDM interval while the MS is scanning for the femtocell BS and attaches to the macro BS instead, the macro BS transmits a message that triggers the MS to repeat scanning for the femtocell BS.

19. The medium of claim 18 wherein the method further comprises:

operating a macro BS to transmit a message over a backhaul link to a femtocell BS during handover preparation that causes the femtocell BS to cease operating in the LDM when an MS sends a scan request or handover request to the macro BS or when the macro BS initiates scanning by the MS via an unsolicited scanning or handover command.

20. The medium of claim 18 wherein the method further comprises:

operating the macro BS to, if an MS is unsuccessful in attaching to the femtocell BS during network entry, network re-entry, or an uncontrolled handover into the femtocell of the femtocell BS due to the femtocell BS being in an unavailable interval while the MS is scanning for the femtocell BS and attaches to the macro BS instead, transmit a message over the backhaul link to the femtocell BS that causes the femtocell BS to cease operating in the LDM and resuming normal transmission for wireless subsystem.

\* \* \* \* \*